United States Patent [19]

Maurin

[11] 3,931,044

[45] Jan. 6, 1976

[54] METHOD FOR RECOVERING MOLYBDENUM CATALYST VALUES AND USE OF SAID VALUES IN THE RECYCLING OF SAID CATALYST

[75] Inventor: Jean Maurin, Montivilliers, France

[73] Assignee: Compagnie Francaise de Raffinage, Paris, France

[22] Filed: Feb. 25, 1974

[21] Appl. No.: 445,322

Related U.S. Application Data

[63] Continuation of Ser. No. 178,234, Sept. 7, 1971, abandoned.

[30] Foreign Application Priority Data

Sept. 9, 1970  France .............................. 70.32746

[52] U.S. Cl............. 252/414; 252/412; 252/431 R; 260/635 H; 260/348.5 L
[51] Int. Cl.$^2$...................... B01J 37/00; B01J 31/12; C07C 29/02
[58] Field of Search................ 252/414, 412, 431 R; 260/635 H, 429 R; 423/56

[56] References Cited
UNITED STATES PATENTS

| | | | |
|---|---|---|---|
| 3,453,068 | 7/1969 | Tave .................................. | 423/59 |
| 3,463,604 | 8/1969 | Tave ................................ | 260/635 H |
| 3,629,144 | 12/1971 | Hahm et al. ........................ | 252/412 |
| 3,822,321 | 7/1974 | Maurin et al. .................. | 252/431 R |

*Primary Examiner*—Patrick P. Garvin
*Assistant Examiner*—P. E. Konopka
*Attorney, Agent, or Firm*—Curtis, Morris & Safford

[57] ABSTRACT

This application is directed to a method for regenerating catalyst values used in the synthesis of a diol; the synthesis consists of a hydroperoxide reaction with an olefin in the presence of water and a molybdenum catalyst; the regenerating process consists in treating the molybdenum catalyst residue (or a fraction thereof) with ammonia — optionally after calcining — and causing a diol to act on the ammonium molybdate so obtained; in one embodiment ammonia in gaseous form is passed in contact with a catalyst residue (not previously calcined) which is in solution; the reaction products in the synthesis of the diol are a hydroperoxide such as tertiary hydroperoxide of isopentane and an olefin such as methyl 2-butene; the diol synthesized in 2-methyl 2,3-butanediol; it is also the synthesized diol which is preferably reacted with the ammonium molybdate.

14 Claims, 1 Drawing Figure

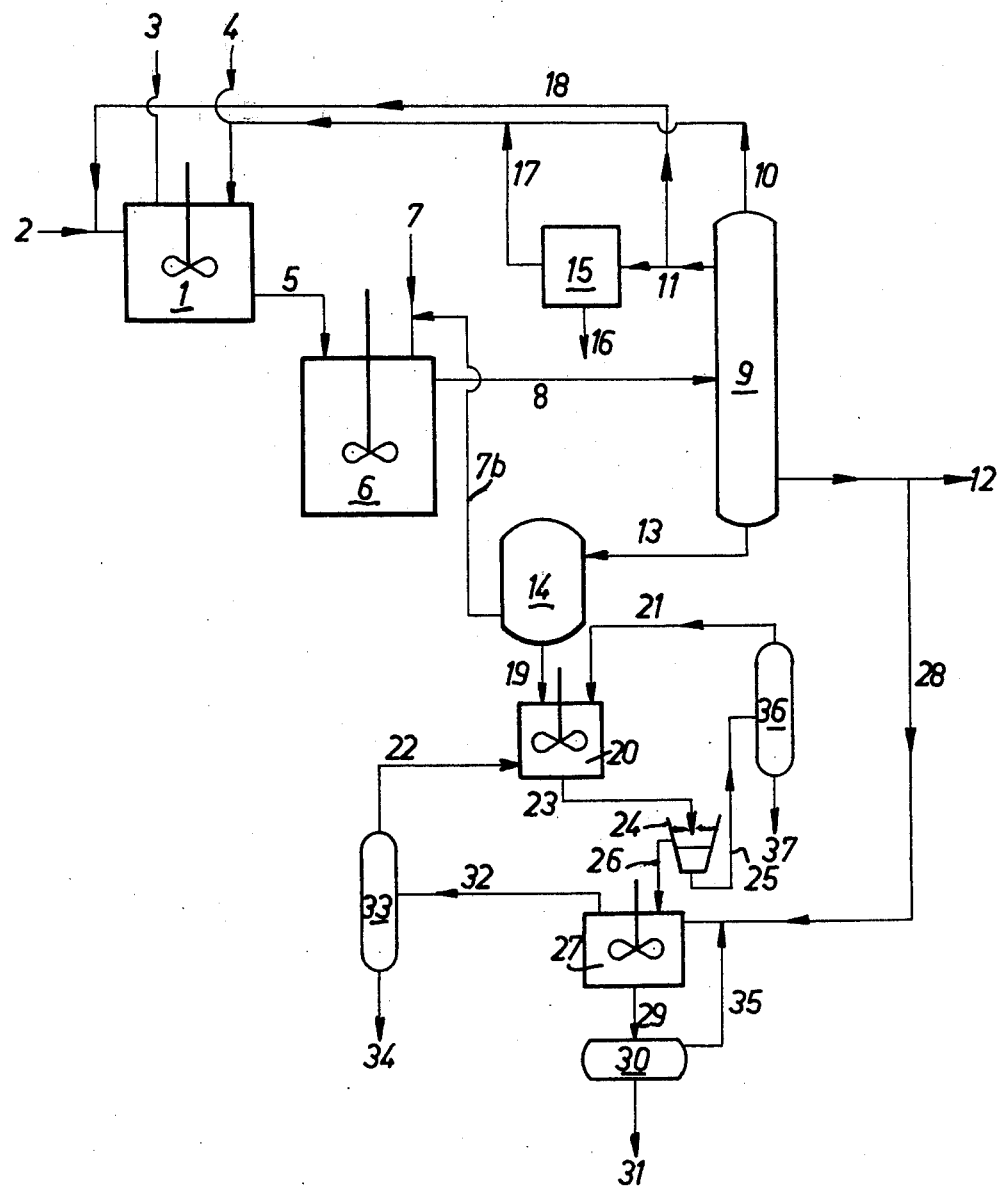

METHOD FOR RECOVERING MOLYBDENUM CATALYST VALUES AND USE OF SAID VALUES IN THE RECYCLING OF SAID CATALYST

This is a continuation of application Ser. No. 178,234, filed Sept. 7, 1971, now abandoned.

The present invention relates to a method of recovering compounds of molybdenum used as catalyst; more particularly it relates to molybdic ester values, and it comprises the use of the recovery process in the recycling of said catalyst in a synthesis of oxides or diols from olefins.

It is known that molybdenum salts are useful as catalysts for the oxidation of olefins by a hydroperoxide; the oxidation products are epoxides or diols corresponding to the olefins employed, depending on whether one operates in anhydrous medium or not.

In the U.S. patent application Ser. No. 92,985, filed Nov. 27, 1970, a method for synthesizing catalyst which contains molybdenum has been described. This process consists in reaction molybdic acid or a salt of said acid with polyalcohol, i.e., a polyhydroxy compound. This patent application also includes a description of the utilization of the catalysts thus obtained in a method for synthesizing vicinal diols, the polyalcohol used then advantageously having the carbon structure of the vicinal diol which it is desired to prepare; the use of the catalyst is of particular interest in the synthesis of methyl 2,3-butanediol, a precursor of isoprene. The above-identified application is incorporated by reference herein in respect to the synthesis aspect of diols.

It has now been found that after removal of the products of synthesis, and in particular the vicinal diols, by distillation, a residue remains from which it is very difficult to isolate the catalyst containing the molybdenum, which therefore becomes more and more diluted as the number of recycles increase.

An object of the present invention is specifically to avoid an increase in the dilution of the catalyst or to limit the catalyst in the recovery of same to desired or acceptable proportions.

Another object of the present invention is a method of recovering the molybdenum contained in an organic compound, the said method being characterized by treating said compound with ammonia in gaseous state or in the form of an aqueous solution, optionally after calcining of the catalyst, whereupon the product of the reaction with the ammonia is contacted with a polyalcohol, i.e., a polyhydroxy compound, to form a molybdic ester, the ammonia being recovered in this second reaction.

The method of the invention finds use in processes which employ molybdic esters as catalysts. This is particularly true of the synthesis of epoxides or diols by oxidation of olefins by means of hydroperoxides.

Still another object of the present invention is the use of the above-defined treatment in the regeneration of a catalyst for the preparation of epoxides or diols by oxidation of olefins with hydroperoxides, wherein the use is characterized by the fact that after separation of the reaction products from the catalyst composition, at least a part of said composition is subjected to the recited combination of steps before being recycled for use in the process.

The process of the invention can be carried out in numerous ways; the spent molybdenum-containing compound from which it is desired to form a molybdic ester can be isolated from the medium in which it is present by a number of means, such as by distillation.

A first embodiment of the present invention consists of calcining the molybdenum-containing fraction containing the spent catalyst (this fraction may be the residue of a distillation) at a temperature of less than about 500°C.

Molybdenum trioxide is recovered thereby and is dissolved in an aqueous ammonia solution. The ammonium molybdate obtained in the previous step is treated with a polyalcohol, i.e., a polyhydroxy compound, in accordance with the process described in the aforementioned U.S. Pat. application and converted to the molybdic ester. When the polyhydroxy compound is methyl 2,3-butanediol, for instance, the reaction can be carried out at 80°C under reduced pressure.

A second embodiment of the invention consists in directly treating the spent molybdenum-containing fraction with an aqueous solution of ammonia but without prior calcining. The ammonium molybdate obtained, which is in an aqueous phase, is treated with a polyalcohol to give a molybdic ester; the latter is not identical with the one which is obtained by the use of the first embodiment of the invention; however, it has excellent catalylic properties.

A third embodiment of the invention which is particularly advantageous consists in directly treating the molybdenum-containing fraction, without prior calcining, with ammonia in gaseous state. The ammonium molybdate then appears in the form of a precipitate which can be allowed to settle out and filtered as a precipitate. This treatment is carried out under very favorable conditions when the fraction to be treated by the gaseous ammonia is placed in solution in a solvent such as acetone. The ammonium molybdate obtained is then treated with a polyalcohol.

The accompanying drawing is a schematic showing, given by way of illustration and not of limitation, of an apparatus for the utilization of the present invention as a component in a method for obtaining methyl 2,3-butanediol.

In reference to the FIGURE wherein a process is represented schematically, isopentane tertiary hydroperoxide is introduced into a mixer 1 through the line 2, water is introduced through the line 3 and methyl 2-butene is introduced through the line 4. After these products have been mixed, there are introduced via the line 5 into a reactor 6 in which the reaction catalyst, consisting of the molybdic ester, is introduced initially or as a make-up or regenerated fraction via the line 7.

The products of the reaction pass via the line 8 into a distillation column 9 which separates these products; the methyl 2-butene which has not reacted passes over at the top through the line 10 and is recycled into the reactor 1; the 2-methyl 2-butanol resulting from the reduction of the isopentane tertiary hydroperoxide, as well as any excess water, are withdrawn through the line 11, while the methyl 2,3-butanediol is withdrawn through the line 12.

Finally, the catalyst mixed with the distillation residue is recovered via the line 13 as bottoms of distillation column 9, is introduced in a storage vessel 14, and the portion of catalyst which is not regenerated is reintroduced through line 7b into the reactor 6.

The alcohol withdrawn through the line 11 is dehydrated, at least in part, in the reactor 15, for instance over alumina. The water is removed from this reactor via the line 16, while the resultant methyl 2-butene is recycled through the line 17 to the mixer 1.

The part of the alcohol which is not desired to be dehydrated in the reactor 15 can be recycled via the line 11 directly into the mixer 1 to serve as solvent.

The part of the molybdenum-containing compound which is desired to be regenerated (generally in the range of from 20% to 80% of the recovered bottom portion withdrawn from distillation column 9 via line 13 in the form of molybdic ester) is introduced via the line 19 into a reactor 20 containing an agitator. A solvent, such as acetone, and gaseous ammonia are introduced through the lines 21 and 22, respectively. The product of the reaction is withdrawn through the line 23 and arrives into a separator 24; the organic phase is extracted via the line 25; and the ammonium molybdate, via the line 26.

The ammonium molybdate arrives into a reactor 27 in which fresh methyl 2,3-butanediol is introduced through the line 28. After reaction, the liquid and solid products are introduced via the line 29 into a separator 30. The molybdic ester is withdrawn via the line 31 and re-introduced via the line 7 into the reactor 6. The ammonia and the water vapor emerging from the reactor 27 pass via the line 32 into a gaseous ammonia regenerating device 33, such as a distillation column; the gaseous ammonia is recycled via the line 22 into the reactor 20, while water is discharged through the line 34.

Excess methyl 2,3-butanediol saturated with catalyst is recycled from the separator 30 to the reactor 27 via the line 35. The acetone is removed from the organic phase (collected via line 25) in column 36 and is recycled via the line 21, while the residue is withdrawn at 37. This residue comprises mainly heavy hydroxyl and ether compounds.

Furthermore, the present invention is illustrated by the following examples which are given solely by way of illustration and not as limitations on the broader scope of the invention.

EXAMPLE I

A — Preparation of Molybdic Ester

Ammonium molybdate in solution is prepared by dissolving, in water at 40°C, 0.047 mol of molybdenum oxide ($MoO_3$), and 0.094 mol of ammonia ($NH_4OH$); in this way 0.047 mol of ammonium molybdate $[MoO_4(NH_4)_2]$ is obtained. To this solution there are added 100 cc of benzene containing 0.095 mol of methyl 2,3-butanediol (i.e., 9.88 g of the diol product). Water, containing the ammonia, is azeotropically distilled until complete exhaustion. A yellow precipitate is then formed which is collected after evaporation of the benzene; this precipitate contains 28.7% by weight molybdenum.

B — Preparation of Methyl 2,3-Butanediol

The solid product consisting of the molybdic ester is introduced into an autoclave together with 12 moles of tertiary butyl hydroperoxide, 36 mols of methyl 2-butene and 36 mols of water. Heating is effected for 1 hour at 120°C. After distillation there are collected 9.84 mols of methyl 2,3-butanediol (namely 1,024 grams) and 96 grams of a residue containing 4.67% by weight of molybdenum and containing no 2-methyl 2,3-butanediol. Therefore, in the manner there is collected 0.0467 gram atom of molybdenum in organic solution.

C — Recovery of the Molybdenum; Regeneration of the Ester

The organic solution containing the molybdenum obtained as residue is used as catalyst in a reaction for the oxidation of methyl 2-butene by tertiary butyl hydroperoxide as previously described in reference to the drawing; it, as a matter of fact, retains the catalytic properties of the molybdic ester. However, within the scope of the process of the present invention, at least a part of the molybdic ester is again regenerated.

For this purpose, 48 g of organic solution containing 2.24 g of molybdenum (that is to say, 0.023 gram atom) are subjected to calcining in a crucible, first of all at low temperature in order to eliminate the volatile compounds and then in a muffle furnace at 500°C. There are then obtained 3.35 g of molybdenum oxide ($MoO_3$), i.e., 0.023 mol. Taking the experimental losses into consideration, the molybdenum originally used has been recovered.

The molybdenum oxide obtained is then transformed into ammonium molybdate and then into molybdic ester by the process described above under A. The molybdic ester is regenerated and is used as catalyst in accordance with the process described above under B.

EXAMPLE II

To the second part of the residue obtained in Example I (B), i.e., to 48 g of 4.67% organic solution of molybdenum, 3 N ammonia is added at room temperature. It is found that 0.046 mol of ammonia must be added to obtain a neutral state.

Benzene is added to obtain a good separation since this substance dissolves the supernatant organic phase. The benzene phase is washed with water; the wash water is then added to the aqueous phase.

0.063 mol of methyl 2,3-butanediol and therewith fresh benzene are added to the aqueous phase. The water present in the mixture is azeotropically distilled.

During this operation, the ammonia (0.046 mol) which had been used for the formation of the ammonium molybdate is recovered. The appearance of a brown precipitate is noted. The benzene is evaporated and the solid product obtained is heated under a vacuum of about 3 mm mercury. In this way 0.033 mol of methyl 2,3-butanediol is recovered.

The solid product weighs 8.78 g. It contains 2.20 g of molybdenum, namely 0.023 gram atom, which corresponds to a content of 25.1% molybdenum. This molybdic ester can be used as catalyst in a new diol synthesis cycle, as described in Example I and in the drawing.

EXAMPLE III

This example illustrates the treatment of a residue similar to that obtained in Example I (B) by gaseous ammonia.

An amount of 9.183 g of residue obtained under conditions similar to those described in Example I (B) and containing 5.02% by weight of molybdenum, i.e., 0.048 gram atom of said metal, is dissolved in 50 cc of acetone containing about 0.5% by weight water. Gaseous ammonia is bubbled into said solution; a stirrer makes it possible for good contact between the ammonia and the liquid.

The appearance of a white precipitate is noted, and it is filtered off. This precipitate is then rinsed with a small amount of acetone and then dried. Analysis thereof shows that is corresponds to the formula of ammonium molybdate $[MoO_4(NH_4)_2]$, and that thus 0.047 gram atom of molybdenum has been recovered. The ammonium molybdate is then contacted with methyl 2,3-butanediol to form molybdic ester, which is then recycled as catalyst.

This embodiment represents the most advantageous aspect of this invention when coupled to the process for preparing the diols previously described.

In summary, the above-described invention is mainly directed to recovery or regeneration of catalyst values in a process for synthesis of a diol containing from two to 10 carbon atoms, more particularly four or five carbon atoms, by reacting an olefin having the corresponding carbon number to form the diol and a hydroperoxide which preferably has the same carbon structure as the olefin in water in the presence of a molybdenum catalyst in the range from $5 \times 10^{-4}$ to $5 \times 10^{-2}$ atom of Mo based on the total content of hydroperoxide wherein the improvement comprises the steps of : distilling a reaction mixture comprising said diol in a weight percent range from 10 to 50 and, as an intermediate synthesis product, an alcohol in a weight percent range from 8 to 45 based on said reaction mixture and which alcohol is derived from said hydroperoxide; recovering said diol as a product of said distillation; recovering a bottom fraction of said distillation which comprises of the following constituents in the following weight percent ranges :

molybdenum compound : 1,5 to 20% expressed in $MoO_3$ diol : zero to 60% heavy organic products : complement to 100% introducing a first part of said bottom fraction generally from 20 to 80% by weight of the bottoms containing said molybdenum catalyst in the amount from 1% to 14% of molybdenum based on weight of the bottoms as a catalyst recycle stream into a synthesis zone for said diol; introducing into a first reaction zone a solvent in the range from 15 to 85 based on weight percent of the total charge to said first reaction zone and for reaction in said reaction zone ammonia in the range from 0.05 to 6 based on weight percent of the total charge to said first reaction zone and a second part of said bottom fraction containing molybdenum catalyst values and water which is in the percent ranges as given above for said bottoms constituents; separating after reaction from said first reaction zone as a first phase from about 70 to about 99% by weight an organic phase comprising said solvent and as a second phase ammonium molybdate; introducing said ammonium molybdate and said diol in an amount from 2.2 to 50 mole % based on said ammonium molybdate in a second reaction zone for obtaining a molybdic ester; withdrawing from said reaction zone ammonia and water wherein water constitutes from 50 to 70% by weight of said withdrawn charge; introducing said ammonia and water in an ammonia separation zone; recycling said ammonia to said first reaction zone; separating said diol saturated with molybdic ester from said molybdic ester; recycling said diol saturated with said molybdic ester to said second zone; recovering said solvent from said organic phase; reintroducing a recovered solvent into said first reaction zone, and recycling said molybdic ester to said synthesis zone as a 20 to 80% percent charge of the total catalyst charge based on said molybdic ester.

As useful solvents for the process described above, the following are mentioned by way of example :

acetone methylethylketone methylisopropylketone

What is claimed is:

1. A process for regenerating as a molybdic ester, a molybdenum catalyst used in synthesizing a vicinal alkane diol having four or five carbon atoms per molecule by contacting in an aqueous medium butene or methyl-butene, an alkane hydroperoxide which forms an alcohol as reduction product, and a catalyst which consists essentially of the reaction product of molybdic acid or ammonium molybdate with a vicinal alkanediol having four or five carbon atoms per molecule; separating the products of the reaction by distillation to isolate any unreacted olefin, said alcohol, said diol, and with the distillation bottoms said catalyst; comprising the steps of:

a. taking at least a portion of said bottoms and reacting ammonia with the molybdenum content thereof to form ammonium molybdate;

b. separating said ammonium molybdate from at least any organic phase of the reaction mixture resulting from step (a);

c. reacting an aqueous solution of said ammonium molybdate with an amount of said diol to convert said ammonium molybdate to the corresponding molybdic ester precipitate with released ammonia being recycled to step (a).

d. separating said precipitate from the reaction mixture of step (c) and recycling it as at least a portion of the catalyst for said synthesizing process.

2. The process as defined in claim 1 wherein the bottoms of step (a) is dissolved in a solvent and contacted with gaseous ammonia.

3. The process as defined in claim 2 wherein said ammonia and said solvents constitute respectively from 0.05 to 6 and from 15 to 85 wt. % of the total reaction charge; wherein said solvents are selected from the group consisting of acetone, methylethylketone, and methylisospropylketone; and said portion of bottoms reacted with said ammonia is from 20 to 80% by weight of the bottoms from said synthesizing process.

4. The process as defined in claim 2 wherein said separated organic phase is distilled in turn to separate the organic residue from said solvent, which latter is recycled in step (a).

5. The process as defined in claim 4 wherein the separation in step (b) is by filtration.

6. The process as defined in claim 5, wherein said ammonia and water are boiled off in step (c) and thereafter are separated from one another by distillation, said gaseous ammonia being then recycled to step (a), and further wherein excess diol from step (d) saturated with molybdic ester is recycled to step (c).

7. The process as defined in claim 6, wherein said solvent in step (a) in acetone.

8. The process as defined in claim 1, wherein the bottoms in step (a) is first calcined at a temperature of less than about 500°C, converting the catalyst therein to $MoO_3$, which in turn is reacted with said ammonia in an aqueous solution.

9. The process as defined in claim 8 wherein said ammonia reaction in step (a) is at about 40°C and said ammonium molybdate reaction in step (c) is at about 80°C.

10. The process as defined in claim 1 wherein said ammonia and water are boiled off in step (c).

11. The process as defined in claim 1 wherein the bottoms in step (a) is directly treated with an aqueous solution of ammonia, the resulting aqueous phase containing ammonium molybdate is decanted from the organic phase and thereafter treated according to step (c).

12. The process as defined in claim 11 wherein the organic phase is distilled to separate the organic residue from said solvent, which latter is recycled to step (a); wherein said ammonia and water are boiled off in step (c) and thereafter are separated from one another by distillation, said gaseous ammonia being then recycled to step (a); and further wherein excess diol from step (d) saturated with molybdic ester is recycled to step (c).

13. The process as defined in claim 7 wherein said diol is butane diol-2,3; said olefin is butene-2; said hydroperoxide is t-butyl hydroperoxide; and said alcohol is t-butyl alcohol.

14. The process as defined in claim 7 wherein said diol is methyl-2-pentane diol-2,3; said olefin is methyl-2-butene-2; said hydroperoxide is t-amyl hydroperoxide; and said alcohol is t-amyl alcohol.

* * * * *

UNITED STATES PATENT AND TRADEMARK OFFICE
CERTIFICATE OF CORRECTION

PATENT NO. : 3,931,044
DATED : January 6, 1976
INVENTOR(S) : Jean Maurin

It is certified that error appears in the above-identified patent and that said Letters Patent are hereby corrected as shown below:

Claim 10, line 1, "1" should be --8--.

Signed and Sealed this sixth Day of April 1976

[SEAL]

Attest:

RUTH C. MASON
*Attesting Officer*

C. MARSHALL DANN
*Commissioner of Patents and Trademarks*